United States Patent Office 3,708,529
Patented Jan. 2, 1973

3,708,529
PROCESS FOR PREPARING PHENYLACETIC ACID
Luigi Cassar, Marco Foa, and Gian Paolo Chiusoli, Novara, Italy, assignors to Montecatini Edison S.p.A., Milan, Italy
No Drawing. Filed July 22, 1970, Ser. No. 57,356
Claims priority, application Italy, July 23, 1969, 19,996/69
Int. Cl. C07c 63/54
U.S. Cl. 260—515 R    3 Claims

ABSTRACT OF THE DISCLOSURE

Process for the synthesis of phenylacetic acid by carbonylation of benzyl chloride. The process comprises reacting benzyl chloride and carbon monoxide under atmospheric pressure, at temperatures from 20° to 80° C. in a water-methanol medium containing up to 35% water, using a catalyst mixture consisting of a cobalt salt, an iron-manganese alloy and a sulphurated promoting agent. Calcium oxide is used as a neutralizing agent. The calcium salt obtained is treated with a strong mineral acid to free the phenylacetic acid.

---

Our invention relates to the synthesis of phenylacetic acid by carbonylation of benzyl chloride.

Much research has gone into the preparation of phenylacetic acid from benzyl chloride and carbon oxide. The carbonylation technique originated from the studies conducted by W. Reppe (Ann. 582, page 1). Later on the carbonylation under atmospheric pressure of allyl halides (G. P. Chiusoli, Gazz. Chim. Ital. (1959) 1332; Chim. e Ind. (Milan) 41 (1959) 503) has resulted in further progress. The similar benzyl derivatives have been carbonylated with cobalt catalysts under atmospheric pressure of CO (R. F. Heck and McDaniel Crest, U.S. Pat. No. 3,116,-306) with catalysts based on rhodium under high pressures of CO (J. Tsuji, Nippon Kagaku Zashi 88 (1967), 687), and with catalysts based on nickel under atmospheric pressure of CO (L. Cassar, M. Foa, U.S. Ser. No. 808,354, filed Mar. 18, 1969). The use of salts of cobalt hydrocarbonyl for the purpose of preparing esters from alcohols and CO is described in a British Pat. No. 713,-515, assigned to BASF.

All these processes, however, involve several drawbacks primarily in the use of high pressures; in the necessity of separate preparation of the catalyst under conditions different from the synthesis conditions; in the rather low yields; in the low reaction rates or in the use of special solvents. On the other hand, the process of the present invention makes it possible to obviate all the above-cited drawbacks, offering the possibility of obtaining phenylacetic acid by carbonylation under atmospheric pressure, with the preparation of the catalyst "in situ," under the same conditions as the synthesis conditions with practically quantitative yields, with a high reaction rate and using methanol-water mixtures as a solvent.

The process of the present invention, is characterized in that it is carried out in the presence of a catalytic system (A) consisting of a cobalt salt, an iron-manganese alloy and sulphurated promoters in an aqueous alcoholic solvent and calcium oxide as neutralizing agent.

The global reaction describing the formation of calcium salt of phenylacetic acid is the following:

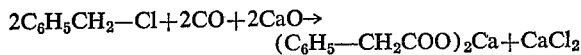

The free phenylacetic acid may then be easily obtained by a simple displacement with strong mineral acids.

The catalyst (A) is prepared from a soluble cobalt salt, a Fe/Mn alloy (containing about 80% Mn) and a sulphurated promoting agent, in methanol or a methanol/water mixture, under atmospheric pressure of carbon monoxide at temperatures comprised between 10°–80° C., preferably between 25°–35° C. The concentration of the cobalt salt in the solution is between 0.3 and 1 mole/liter, from 1 to 2 moles of Mn are used in the form of a Fe/Mn alloy for every mole of cobalt salt. The Fe/Mn alloy is previously ground in order to pass through a sieve of 5,000 mesh/cm.[2]. The preferred sulphurated promoting agents are sodium sulphide and thiosulfate and they are used in quantities from 0.01 to 0.1 mole per mole of cobalt salt. The mixture is well stirred for 2–3 hours.

The catalytic mixture thus obtained is diluted from 4 to 12 times, preferably from 6 to 9 times, with an additional quantity of methanol and water. The concentration of water in the mixture is between 0 to 35% and preferably 15 to 25%. The mixture obtained is brought to a temperature of 20°–80° C., preferably 50–60° C. The carbon monoxide atmosphere is maintained on the well-stirred solution at about 1 ata. (atmosphere absolute). The benzyl chloride is added in about 3 hours in quantities of 25–50%, preferably 35–45% with respect to the solvent weight. Calcium oxide is added gradually, and is present in the reaction mixture always in excess with respect to the added benzyl chloride. The use of the aqueous alcoholic solvent mixture permits easier neutralization of the acidity, which forms during the reaction, and therefore a better protection of the catalytic system with a consequent increase in the catalytic activity. At the end of the reaction the solvent is recovered by distillation. From the calcium salt of the phenylacetic acid thus obtained, it is possible to free, by adding a strong acid, preferably hydrochloric acid, the phenylacetic acid, which may be thus extracted with an organic solvent.

Operating as described above, gives yields, with respect to benzyl chloride, between 95–98%. The productivity of phenylacetic acid is equal to 60–150 moles per mole of cobalt. The phenylacetic acid thus obtained is used in the synthesis of perfumes (phenylethyl phenylacetate, benzyl phenylacetate) or, after having been halogenated, for the synthesis of "Phentoate" insecticide.

The following example, is given to illustrate the present invention without limiting the scope thereof.

EXAMPLE 90 ml. methanol, 10 g. $CoCl_2 \cdot 6H_2O$, 0.20 g. sodium sulphide and 0.75 g. sodium thiosulphate are introduced into a 2 l. flask, provided with a stirrer, a feeding funnel for liquids, a feeding funnel for solids, a thermometer, a water cooler and a pH-meter. The stirrer is started (500 revolutions/minute) and 4.5 g. of a Mn/Fe alloy (Mn 80%), ground to more than 10,000 mesh/cm.[2], are introduced. The absorption of CO starts immediately and continues for 3 hours.

3.2 N l. (normal liters, i.e., liters under normal conditions) CO (85% of the theoretic absorption) on the whole are absorbed. 500 ml. methanol and 195 ml. water are added to the methanol suspension thus obtained. It is put under stirring, the temperature is brought to 55° C. and 300 g. benzyl chloride and 141 g. calcium oxide are added in 3 hours, keeping the mixture under a head of carbon monoxide. When the addition is ended, the mixture is kept under stirring for another hour. 49 N l. of carbon monoxide on the whole are absorbed. 230 ml. water are added to the mixture and by distillation 625 ml. of a water-methanol mixture are recovered, containing 11% of water which may be used for subsequent tests.

Then 209 ml. concentrated hydrochloric acid (44 g. HCl in 100 cc.) and 350 ml. of dichloroethane are added to the distillation residue. The lower aqueous phase is removed and the upper organic phase is evaporated until it is completely dry, thus obtaining 313 g. of 99% phenylacetic acid.

We claim:

1. Process for obtaining phenylacetic acid by carbonylation of benzyl chloride, which comprises reacting benzyl chloride and carbon monoxide under atmospheric pressure and at temperatures from 20° to 80° C., in a water-methanol solution containing 0–35% of water, in the presence of a catalyst consisting of a cobalt salt, an iron-manganese alloy and sulphurated promoting agents selected from the group consisting of alkaline sulphides and the thiosulphates and using calcium oxide as a neutralizing agent and subsequently, treating the calcium salt thus obtained with a strong mineral acid to free the phenylacetic acid.

2. The process of claim 1, wherein the cobalt salt is cobaltous chloride.

3. The process of claim 1, wherein the quantity of calcium oxide used is at least equal to 1 mole for each mole of benzyl chloride.

References Cited

UNITED STATES PATENTS 3,636,082   1/1972   Knowles _____ 260—475

OTHER REFERENCES

Friedman et al.: J. Org. Chem., vol. 27 (1962), pp. 481–7.

Nesmeyanov et al.: Chem. Abstracts, vol. 70 (1969), p. 68487 g.

JAMES A. PATTEN, Primary Examiner

U.S. Cl. X.R.

252—439